US008224498B2

United States Patent
Guan

(10) Patent No.: US 8,224,498 B2
(45) Date of Patent: Jul. 17, 2012

(54) DEVICE FOR CONTROLLING HEAT DISSIPATION OF APPARATUS AND APPARATUS HAVING THE SAME

(75) Inventor: Minghui Guan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 279 days.

(21) Appl. No.: 12/702,926

(22) Filed: Feb. 9, 2010

(65) Prior Publication Data

US 2010/0214739 A1    Aug. 26, 2010

(30) Foreign Application Priority Data

Feb. 23, 2009    (CN) .......................... 2009 1 0078249

(51) Int. Cl.
    G05D 23/00    (2006.01)
(52) U.S. Cl. ........ 700/300; 700/299; 713/310; 713/320; 713/340; 361/709; 361/712; 361/717
(58) Field of Classification Search .......... 700/299–300; 713/300, 310, 320, 340; 361/709, 712, 717; 702/130, 134
    See application file for complete search history.

(56) References Cited

U.S. PATENT DOCUMENTS

| | | | | |
|---|---|---|---|---|
| 6,163,087 A * | 12/2000 | Huang et al. | ..................... | 307/64 |
| 6,380,704 B1 * | 4/2002 | Chin | ............................. | 318/268 |
| 6,463,891 B2 * | 10/2002 | Algrain et al. | ............. | 123/41.12 |
| 6,996,441 B1 * | 2/2006 | Tobias | ............................ | 700/44 |
| 2003/0030977 A1 * | 2/2003 | Garnett et al. | ................ | 361/687 |
| 2005/0156544 A1 * | 7/2005 | Marando et al. | ............... | 318/268 |
| 2005/0174737 A1 * | 8/2005 | Meir | ............................. | 361/697 |
| 2005/0209740 A1 * | 9/2005 | Vann, Jr. | ....................... | 700/300 |
| 2005/0216221 A1 * | 9/2005 | Broyles et al. | ................ | 702/132 |
| 2006/0052970 A1 * | 3/2006 | Arabi et al. | .................... | 702/132 |
| 2006/0181855 A1 * | 8/2006 | Chen et al. | ..................... | 361/717 |
| 2007/0096665 A1 * | 5/2007 | Ku et al. | ......................... | 318/66 |
| 2007/0250729 A1 * | 10/2007 | Thomas et al. | ............... | 713/322 |
| 2008/0004755 A1 * | 1/2008 | Dunstan et al. | ............... | 700/299 |
| 2008/0273180 A1 * | 11/2008 | Roux | ............................. | 355/30 |
| 2009/0207565 A1 * | 8/2009 | Glover et al. | ................. | 361/688 |

* cited by examiner

*Primary Examiner* — Ramesh Patel
(74) *Attorney, Agent, or Firm* — Dickstein Shapiro LLP

(57) ABSTRACT

A device for controlling heat dissipation of an apparatus and an apparatus having the same are provided. The apparatus comprises at least one heat radiation component. The device comprises: an ambient temperature sensing unit adapted to obtain an ambient temperature of internal space of the apparatus; a component temperature measuring unit adapted to obtain a local temperature for one of the at least one heat radiation component; and a temperature control unit adapted to select a corresponding temperature control profile based on the ambient temperature, and to obtain a control parameter for controlling the temperature of the apparatus based on the local temperature and the temperature control profile. According to the present invention, it is possible to select different temperature control profiles based on the ambient temperature, ant thus to satisfy both the requirement on system heat dissipation at high temperature and the requirement on noise at room temperature, and to avoid the noise resulted from large change in rotational speeds of fans due to change in the ambient temperature.

11 Claims, 4 Drawing Sheets

DEVICE FOR CONTROLLING HEAT DISSIPATION OF APPARATUS AND APPARATUS HAVING THE SAME

FIELD OF THE INVENTION

The present invention generally relates to the heat dissipation technology, and more particular, to a device for controlling heat dissipation of an apparatus and an apparatus having the same.

BACKGROUND OF THE INVENTION

At present, a general temperature control scheme for an electronic apparatus, especially for a computer, is shown in FIG. 1. As shown, a super input/output (I/O) interface reads a CPU temperature, compares it with a temperature control parameter stored in a Basic Input Output System (BIOS), and then output a corresponding duty cycle as a control parameter to a CPU fan and a system fan for controlling them to operate at corresponding rotational speeds.

In controlling respective fans according to prior art, a linear temperature control scheme is adopted, as shown in FIG. 2. In this case, the CPU temperature is shown as a difference from an overheating protection temperature, Tdts, and thus is typically negative. When the CPU temperature is lower than a certain temperature, the CPU fan and the system fan are set to operate at a minimum rotational speed. When the CPU temperature is higher than a certain temperature, the CPU fan and the system fan are set to operate at full rate or a predetermined rate. And when the CPU temperature lies between a lowest temperature and a highest temperature, the rotational speeds of the CPU fan and the system fan are set to increase/decrease linearly at a predetermined slope with the increase/decrease of the CPU temperature.

In implementation of the present invention, the inventors have discovered at least the following problems with the prior art. Due to the difference between a temperature required for heat dissipation test (e.g., a high temperature of 35 degrees) and a temperature required for noise test (e.g., a room temperature of 23 degrees), the high and low temperatures correspond to different temperature control profiles, respectively. Further, a housing in which the apparatus resides may have different volumes and layouts, which results in different heat dissipation efficiencies during air circling. However, the existing temperature control schemes are typically based on only one temperature control profile, and cannot satisfy requirements on both temperature control and noise in various temperature conditions due to incapability of monitoring the ambient temperature of the apparatus.

SUMMARY OF THE INVENTION

According to an embodiment of the present invention, a device for controlling heat dissipation of an apparatus and an apparatus having the same are provided, by which it is possible to select, based on the ambient temperature of the apparatus, a corresponding temperature control profile to control a local temperature of a heat radiation component, such that the apparatus can operate steadily at various ambient temperatures.

According to an aspect of the invention, there is provided a device for controlling heat dissipation of an apparatus which comprises at least one heat radiation component, comprising: an ambient temperature sensing unit adapted to obtain an ambient temperature of internal space of the apparatus; a component temperature measuring unit adapted to obtain a local temperature for one of the at least one heat radiation component; and a temperature control unit adapted to select a corresponding temperature control profile based on the ambient temperature, and to obtain a control parameter for controlling the temperature of the apparatus based on the local temperature and the temperature control profile.

Preferably, the device may further comprise a temperature adjusting unit adapted to adjust the temperature of the heat radiation component and/or the entire apparatus based on the control parameter.

Preferably, the temperature adjusting unit may comprise: a CPU fan adapted to cool a CPU which is the heat radiation component; and/or a system fan adapted to cool the entire housing space.

Preferably, the temperature control unit may comprise a super input/output interface.

Preferably, the temperature control unit may further comprise: a temperature control profile editing unit adapted to store and modify the temperature control profiles which are at least two in number.

Preferably, the ambient temperature sensing unit is positioned at an air inlet of the apparatus.

Preferably, the device may further comprise: a hysteresis loop unit adapted to set a hysteresis temperature which is a temperature value between two different said temperature control profiles, and to notify the temperature control unit to select the currently operating temperature control profile when the ambient temperature is changed to fall within an interval around the hysteresis temperature.

According to another aspect of the invention, there is provided an apparatus equipped with a device for controlling heat dissipation thereof, the apparatus comprising at least one heat radiation component, wherein the device comprises at least: an ambient temperature sensing unit adapted to obtain an ambient temperature of internal space of the apparatus; a component temperature measuring unit adapted to obtain a local temperature for one of the at least one heat radiation component; a temperature control unit adapted to select a corresponding temperature control profile based on the ambient temperature, and to obtain a control parameter for controlling the temperature of the apparatus based on the local temperature and the temperature control profile; and a temperature adjusting unit adapted to adjust the temperature of the heat radiation component and/or the entire apparatus based on the control parameter.

Preferably, the apparatus may comprise a computer, and the temperature adjusting unit may comprise: a CPU fan adapted to cool a CPU; and/or a system fan adapted to cool the entire housing space.

Preferably, the temperature control unit may comprise a super input/output interface.

Preferably, the apparatus may further comprise: a hysteresis loop unit adapted to set a hysteresis temperature which is a temperature value between two different said temperature control profiles, and to notify the temperature control unit to select the currently operating temperature control profile when the external ambient temperature is changed to fall within an interval around the hysteresis temperature.

The present invention has the following advantageous effects. It is possible to select different temperature control profiles based on the ambient temperature, such that both the requirement on system heat dissipation at high temperature and the requirement on noise at room temperature can be satisfied, and that the noise resulted from large change in the rotational speeds of the fans due to change in the ambient temperature can be avoided.

DETAILED DESCRIPTION OF THE PREFERRED EMBODIMENTS

The present invention is described in detail in the following with reference to the drawings and particular embodiments thereof such that the objects, features and effects of the present invention will be more apparent. According to an embodiment of the present invention, an ambient temperature sensing unit 109 (e.g., an ambient temperature sensor) is added such that a temperature adjusting unit can operate at different temperature control profiles according to the ambient temperature sensed by the ambient temperature sensing unit 109.

Figure 3:
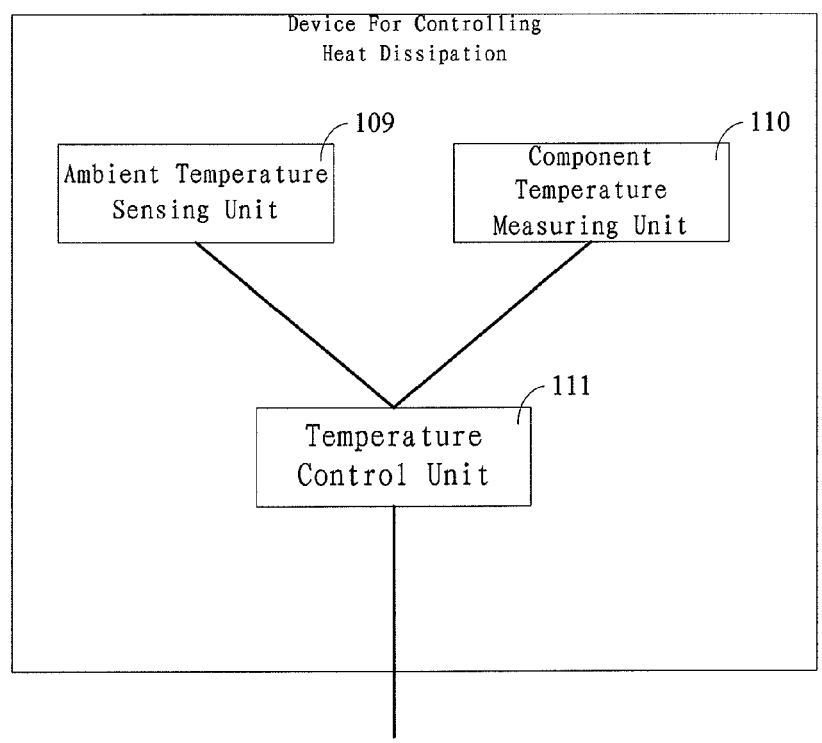
FIG. 3 is a schematic diagram showing the structure of a device for controlling heat dissipation of an apparatus according to an embodiment of the present invention.

According to an embodiment of the present invention, a device for controlling heat dissipation of an apparatus is provided, the apparatus comprising at least one heat radiation component. As shown in FIG. 3, the device comprises:

an ambient temperature sensing unit 109 adapted to obtain an ambient temperature of internal space of the apparatus;

a component temperature measuring unit 110 adapted to obtain a local temperature for one of the at least one heat radiation component; and a temperature control unit 111 adapted to select a corresponding temperature control profile based on the ambient temperature, obtain control parameter(s) for controlling the temperature of the apparatus based on the local temperature and the temperature control profile, and transmit the control parameter(s) to a temperature adjusting unit.

Figure 4:
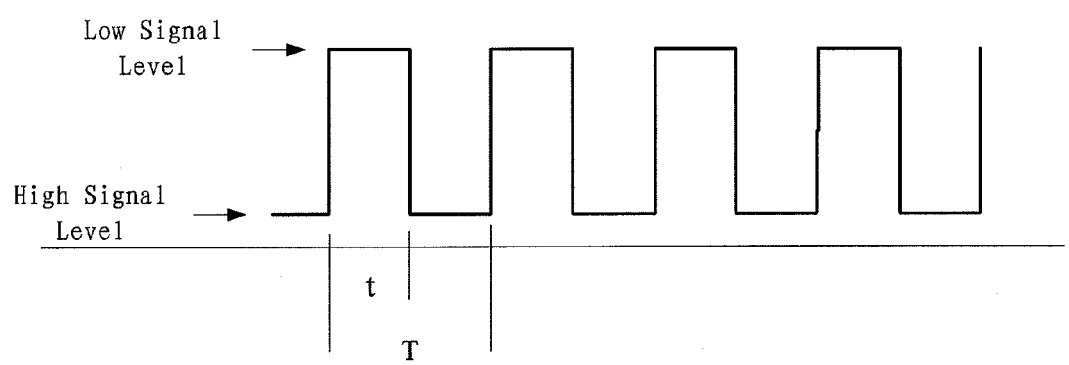
FIG. 4 is a schematic diagram showing control parameters according to an embodiment of the present invention.

Here, as shown in FIG. 4, the control parameters typically comprise:

a duty cycle compliant with the PWM signal specification, t/T, where $0\% \leq t/T \leq 100\%$;

a frequency $f=1/T$, where $21\ \text{KHz} \leq 1/T \leq 28\ \text{KHz}$;

a low signal level, Vl, where $0V \leq Vl \leq 0.4V$; and a high signal level, Vh, where $2.8V \leq Vh \leq 5.25V$.

With the scheme according to this embodiment, for different types of apparatuses, it is possible to select different temperature control profiles based on the ambient temperatures of the apparatuses. Further, since there is a plurality of temperature control profiles, it is possible to select different temperature control profiles according to the change in the ambient temperature. As these temperature control profiles are derived from a priori lab data, they are better compliant with the actual operation scenario, such that the requirement on the control of the CPU temperature can be satisfied. Thus, the requirements on both temperature control and noise can be satisfied in various conditions.

The device may further comprise a temperature adjusting unit adapted to adjust the temperature of the heat radiation component and/or the entire apparatus based on the control parameter(s) from the temperature control unit 111. In the case where the apparatus is a computer, the temperature adjusting unit may be various built-in fans.

Figure 1:
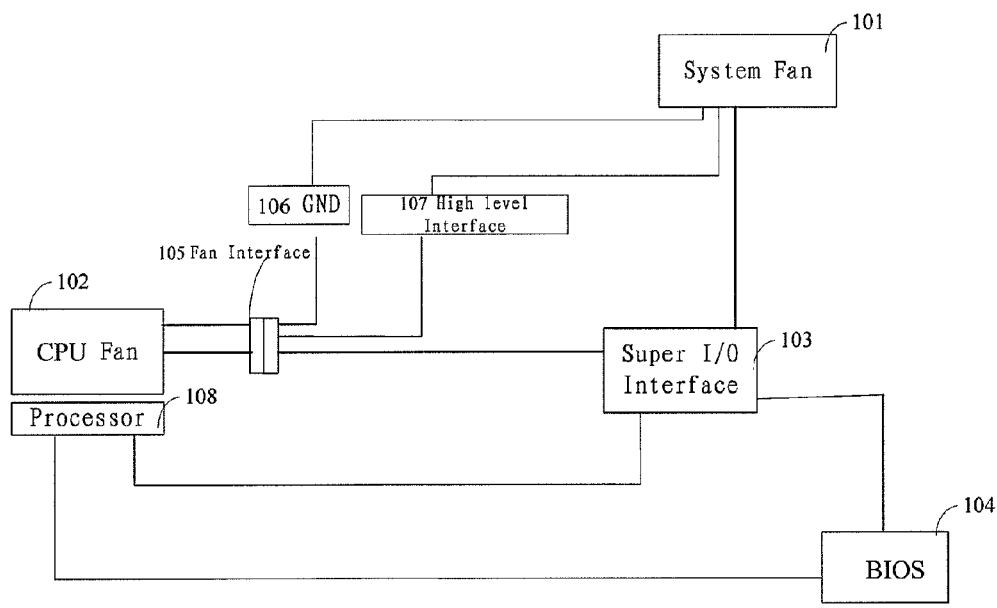
FIG. 1 is a schematic diagram showing a heat dissipation device of a computer according to prior art.
Figure 2:
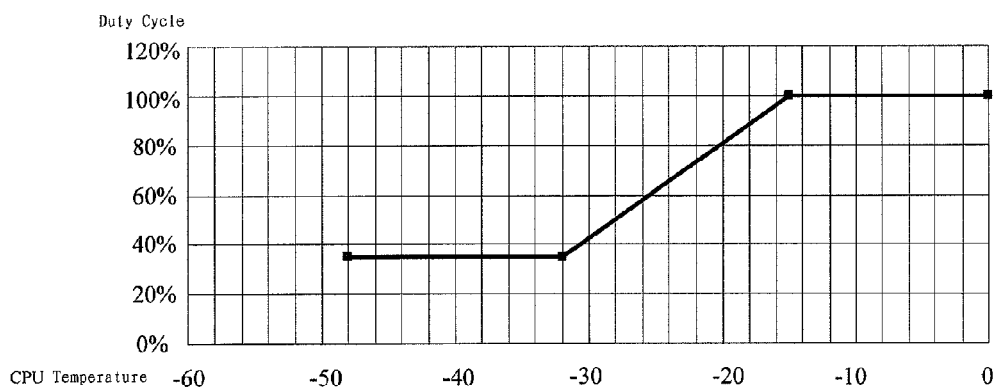
FIG. 2 is a schematic diagram showing a temperature control profile implemented in the heat dissipation device of the computer according to prior art.
Figure 5:
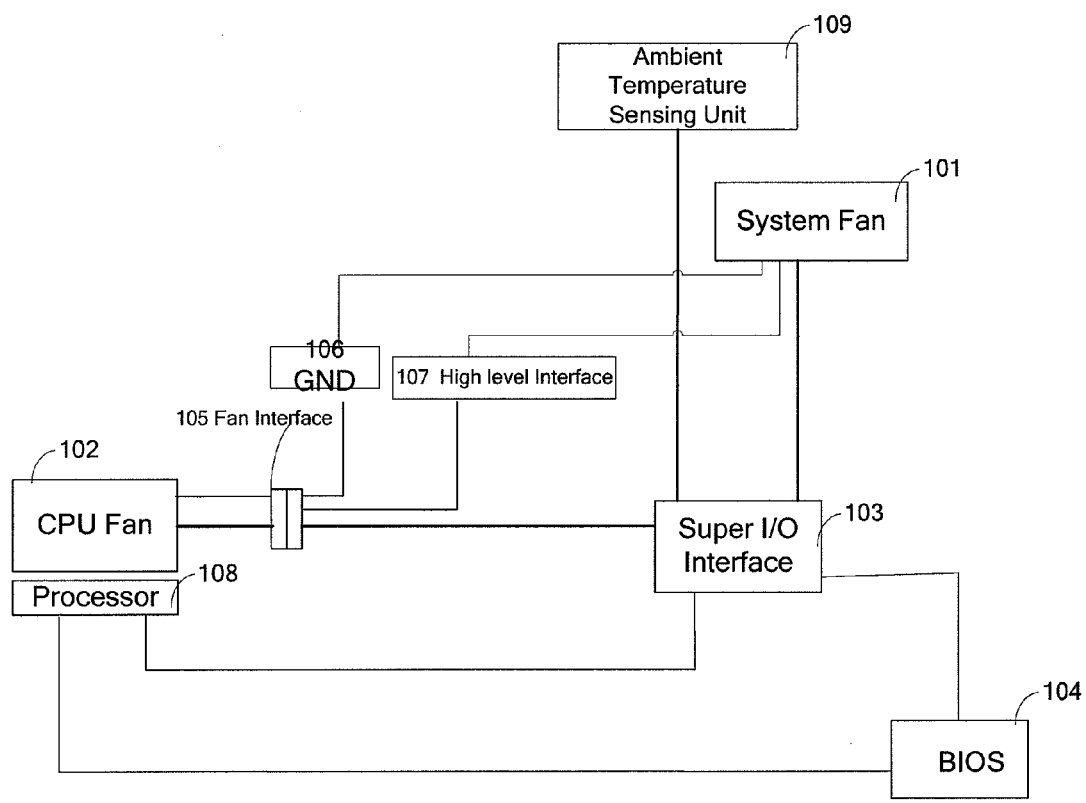
FIG. 5 is a schematic diagram showing the structure of a device for controlling heat dissipation of a computer according to an embodiment of the present invention.

According to an embodiment, as shown in FIG. 5, the device for controlling heat dissipation is applied to a computer. In this case, an ambient temperature sensor 501 is incorporated as the ambient temperature sensing unit 109. A main board serves as a carrier unit. The temperature control unit 111 is in particular a super input/output (I/O) interface 103. Reference numerals for other units and components are same as those illustrated in FIGS. 1 and 2.

The ambient temperature sensor 501 is connected via a sensor cable to an ambient temperature interface (sensor header) arranged on the main board. The other end of the sensor header is connected to a corresponding pin of the super I/O interface 103. The ambient temperature sensor 501 is fixed at the air inlet on the front panel of the housing of the computer to sense the ambient temperature of the environment in which the computer operates.

A BIOS system 104 is adapted to store data describing the respective temperature control profiles.

The super I/O interface 103 is adapted to read the value of the ambient temperature as sensed by the ambient temperature sensing unit 109 at a predetermined interval (e.g., several seconds), obtain data for different temperature control profiles from the BIOS system 104 and determine one corresponding temperature control profile for controlling a CPU fan 102 and a system fan 101 according to the ambient temperature, and then determine specific value for rotational speeds of the CPU fan 102 and the system fan 101 according to the CPU temperature.

In the computer, the temperature adjusting unit particularly comprises:

the CPU fan 102 adapted to cool the CPU; and optionally the system fan 101 adapted to cool the entire housing of the computer.

In this embodiment, the super I/O interface 103 of the computer reads the ambient temperature as sensed by the ambient temperature sensor 501, determines the specific temperature control profile for controlling the CPU fan 102 and the system fan 101 based on the ambient temperature, and then determines the specific rotational speeds, represented by duty cycles, of the CPU fan 102 and the system fan 101 according to the CPU temperature. In this way, it is possible to satisfy both the heat dissipation requirement at high temperature and the noise requirement at room temperature.

Figure 6:
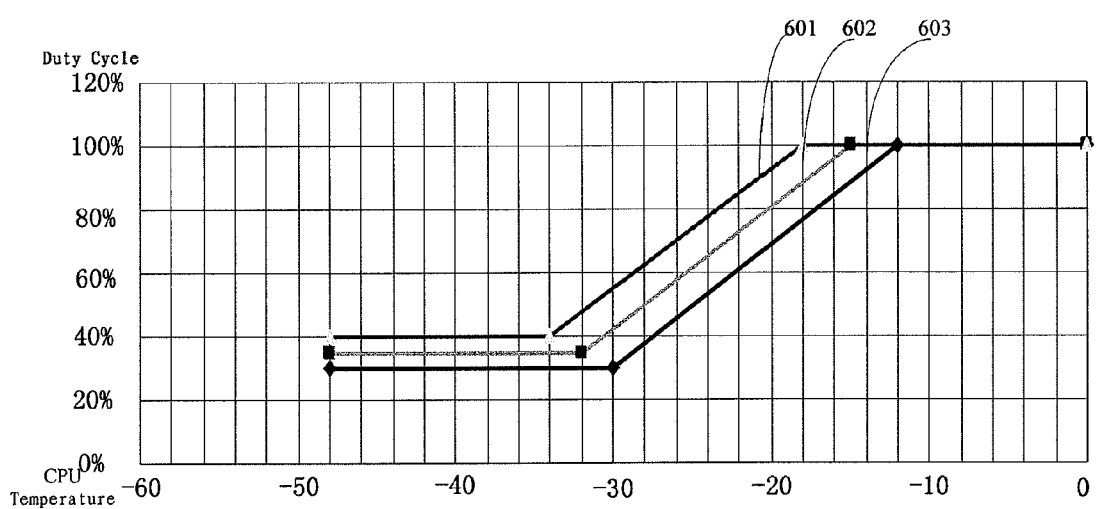
FIG. 6 is a schematic diagram showing temperature control profiles according to an embodiment of the present invention.

As shown in FIG. 6, a plurality of temperature control profiles is utilized in this embodiment. In particular, there are three temperature control profiles, from top to down, a first temperature control profile 601, a second temperature control profile 602 and a third temperature control profile 603. Herein, the CPU temperature is shown as a difference from an overheating protection temperature, Tdts, and thus is typically negative. For example, if the overheating protection temperature is 90° C., the first CPU temperature on the abscissa is 30° C.−90° C.=−60° C.

When the CPU temperature is lower than a certain temperature, the CPU fan and the system fan will be set to operate at a minimum rotational speed according to each temperature control profile. When the CPU temperature is higher than a certain temperature, the CPU fan and the system fan will be set to operate at full rate or a predetermined rate. When the CPU temperature lies between a lowest temperature and a highest temperature, the rotational speeds of the CPU fan and the system fan are set to increase/decrease linearly at a predetermined slope with the increase/decrease of the CPU temperature.

Further, the first temperature control profile 601 is a profile for which the ambient temperature sensed by the ambient temperature sensing unit 109 is below 26° C. (inclusive).

The second temperature control profile 602 is a profile for which the ambient temperature sensed by the ambient temperature sensing unit 109 lies between 27° C. to 31° C. (inclusive).

The third temperature control profile 603 is a profile for which the ambient temperature sensed by the ambient temperature sensing unit 109 is above 32° C. (inclusive).

The device may further comprise some existing units and modules, such as a high level interface 107 for providing operation voltage to the respective units and modules, and a ground 106 for providing reference voltage to the respective units and modules.

With the scheme according to this embodiment, even at the same CPU temperature, the rotational speeds of the CPU fan 102 and the system fan 101 are relatively high when the ambient temperature is high. In this way, the heat dissipation requirement at high ambient temperature can be satisfied. On the other hand, the rotational speeds of the CPU fan 102 and the system fan 101 are relatively low when the ambient temperature is low. In this way, the noise requirement at room temperature can be satisfied. Further, the individual temperature control profiles for different ambient temperatures are set to be parallel with each other, such that the noise resulted from large change in rotational speeds of the fans due to change in ambient temperature can be avoided.

According to an embodiment, a hysteresis loop function is further incorporated. A hysteresis loop unit is provided to set a hysteresis temperature which is in particular a temperature value between two different temperature control profiles. When the ambient temperature is changed to the hysteresis temperature, the temperature control unit 111 selects the current temperature control profile. That is, during the process in which the temperature control unit 111 selects a corresponding temperature control profile based on the inputted ambient temperature, the selection between different temperature control profiles is adjusted and a hysteresis is introduced in the translation of the computer between different temperature control profiles.

For example, if the hysteresis loop unit is introduced, the temperatures at the respective endpoints in FIG. 6 may be modified as follows.

The first temperature control profile 601 is now a profile for which the ambient temperature sensed by the ambient temperature sensing unit 109 is below 26° C. (inclusive).

The second temperature control profile 602 is now a profile for which the ambient temperature sensed by the ambient temperature sensing unit 109 lies between 28° C. to 31° C. (inclusive).

The third temperature control profile 603 is now a profile for which the ambient temperature sensed by the ambient temperature sensing unit 109 is above 33° C. (inclusive).

Thus, a first hysteresis temperature is set as 27° C., which lies between the first temperature control profile 601 and the second temperature control profile 602, and a second hysteresis temperature is set as 32° C., which lies between the second temperature control profile 602 and the third temperature control profile 603. It can be seen from the above that distance between the specific hysteresis temperature and the respective temperature control profiles is 1° C., i.e., the amplitude of the hysteresis temperature is 1° C. The same also applies for the case where the amplitude is 2° C.

If the computer is currently operating under control of the first temperature control profile 601 while the ambient temperature has become 27° C., the temperature control unit 111 still controls the computer to operate according to the first temperature control profile 601 in the case where the hysteresis loop unit is incorporated, although the value of 27° C. corresponds to none of the temperature control profiles.

Also, if the computer is currently operating under control of the second temperature control profile 602 while the ambient temperature has become 27° C., the temperature control unit ill still controls the computer according to the second temperature control profile 602 in the case where the hysteresis loop unit is incorporated, although the value of 27° C. corresponds to none of the temperature control profiles.

The same applies for the selection between other different temperature control profiles. For example, the value of 32° C. is used as the hysteresis temperature between the second temperature control profile 602 and the third temperature control profile 603.

With the scheme of this embodiment, in controlling the CPU temperature, the transition of the computer between different temperature control profiles can be more smoothly and steadily, and thus it is possible to satisfy the requirements on both temperature control and noise in various conditions.

FIG. 5 also shows an apparatus equipped with a device for controlling heat dissipation thereof, the apparatus comprising at least one heat radiation component, wherein the device comprises at least:

an ambient temperature sensing unit 109 adapted to obtain an ambient temperature of internal space of the apparatus;

a component temperature measuring unit 110 adapted to obtain a local temperature for one of the at least one heat radiation component;

a temperature control unit 111 adapted to select a corresponding temperature control profile based on the ambient temperature, obtain control parameter(s) for controlling the temperature of the apparatus based on the local temperature and the temperature control profile, and transmit the control parameter(s) to a temperature adjusting unit; and the temperature adjusting unit adapted to adjust the temperature of the heat radiation component and/or the entire apparatus based on the control parameter(s).

The temperature adjusting unit particularly comprises: a CPU fan 102 adapted to cool the CPU and/or a system fan 101 adapted to cool the entire housing space.

The apparatus may further comprise a hysteresis loop unit adapted to set a hysteresis temperature which is in particular a temperature value between two different temperature control profiles. When the ambient temperature is changed to fall within an interval around the hysteresis temperature, the temperature control unit 111 selects the current temperature control profile. That is, during the process in which the temperature control unit 111 selects a corresponding temperature control profile based on the inputted ambient temperature, the selection between different temperature control profiles is adjusted and a hysteresis is introduced in the translation of the computer between different temperature control profiles.

The apparatus further comprises a carrier unit for carrying the temperature control unit 111.

The temperature control unit 111 may further comprise a temperature control profile editing unit adapted to modify the temperature control profiles which are at least two in number.

The present invention has the following advantageous effects. It is possible to select different temperature control profiles based on the ambient temperature, such that both the requirement on system heat dissipation at high temperature and the requirement on noise at room temperature can be satisfied, and that the noise resulted from large change in the rotational speeds of the fans due to change in the ambient temperature can be avoided.

It is to be noted that the above embodiments are just provided for illumination rather than limitation of the invention. The values for all the parameters may be adjusted depending on actual implementations, and such adjustment falls within the scope of the present invention. One skilled in the art can make various modifications or equivalent alternatives to the embodiments of the present invention without departing from the spirit and scope of the present invention. Those modifications and equivalent alternatives should be encompassed by the scope of the present invention as defined in the following claims.

What is claimed is:

1. A device for controlling heat dissipation of an apparatus which comprises at least one heat radiation component, comprising:
    an ambient temperature sensing unit adapted to obtain an ambient temperature of internal space of the apparatus;
    a component temperature measuring unit adapted to obtain a local temperature for one of the at least one heat radiation component; and
    a temperature control unit adapted to select a corresponding temperature control profile based on the ambient temperature, and to obtain a control parameter for controlling the temperature of the apparatus based on the local temperature and the temperature control profile.

2. The device according to claim 1, further comprising:
    a temperature adjusting unit adapted to adjust the temperature of the heat radiation component and/or the entire apparatus based on the control parameter.

3. The device according to claim 2, wherein the temperature adjusting unit comprises at least one of:
    a CPU fan adapted to cool a CPU which is the heat radiation component; and
    a system fan adapted to cool the entire housing space.

4. The device according to claim 1, wherein the temperature control unit comprises a super input/output interface.

5. The device according to claim 1, wherein the temperature control unit further comprises:
    a temperature control profile editing unit adapted to store and modify the temperature control profiles which are at least two in number.

6. The device according to claim 1, wherein the ambient temperature sensing unit is positioned at an air inlet of the apparatus.

7. The device according to claim 1, further comprising:
    a hysteresis loop unit adapted to set a hysteresis temperature which is a temperature value between two different said temperature control profiles, and to notify the temperature control unit to select the currently operating temperature control profile when the ambient temperature is changed to fall within an interval around the hysteresis temperature.

8. An apparatus equipped with a device for controlling heat dissipation thereof, the apparatus comprising at least one heat radiation component, wherein the device comprises at least:
    an ambient temperature sensing unit adapted to obtain an ambient temperature of internal space of the apparatus;
    a component temperature measuring unit adapted to obtain a local temperature for one of the at least one heat radiation component;
    a temperature control unit adapted to select a corresponding temperature control profile based on the ambient temperature, and to obtain a control parameter for controlling the temperature of the apparatus based on the local temperature and the temperature control profile; and
    a temperature adjusting unit adapted to adjust the temperature of the heat radiation component and/or the entire apparatus based on the control parameter.

9. The apparatus according to claim 8, wherein the apparatus comprises a computer, and wherein the temperature adjusting unit comprises at least one of:
    a CPU fan adapted to cool a CPU; and
    a system fan adapted to cool the entire housing space.

10. The apparatus according to claim 8, wherein the temperature control unit comprises a super input/output interface.

11. The apparatus according to claim 8, further comprising:
    a hysteresis loop unit adapted to set a hysteresis temperature which is a temperature value between two different said temperature control profiles, and to notify the temperature control unit to select the currently operating temperature control profile when the external ambient temperature is changed to fall within an interval around the hysteresis temperature.

* * * * *